Figure 1:
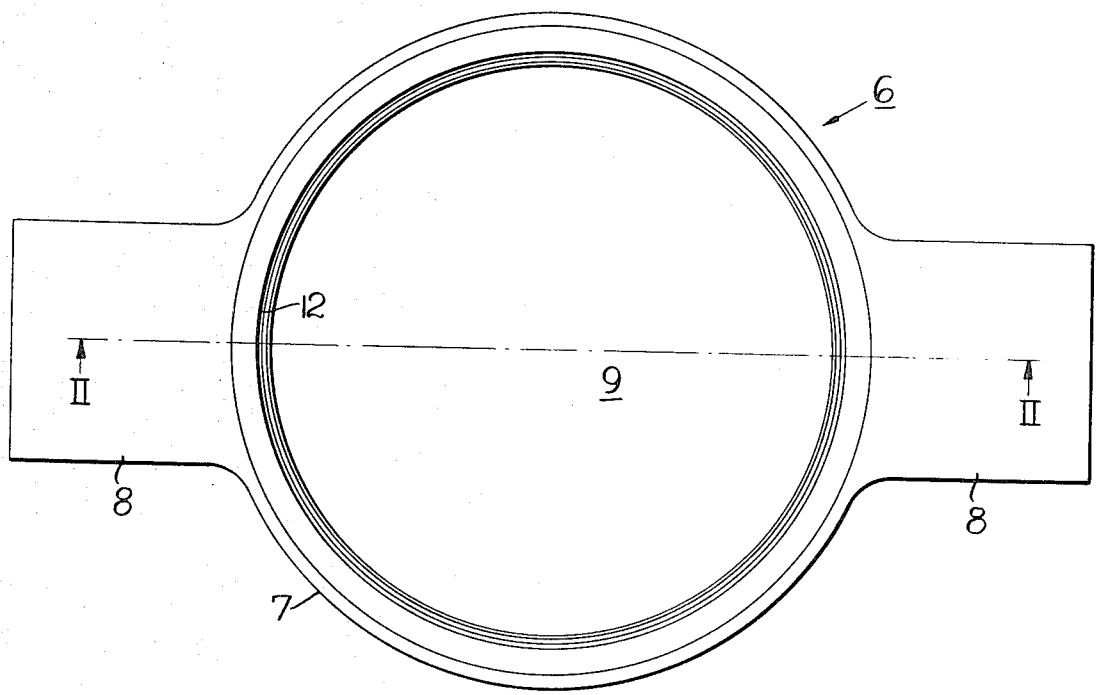

United States Patent

[11] 3,568,709

[72] Inventor Paul E. Fitting
 Camp Hill, Pa.
[21] Appl. No. 775,844
[22] Filed Nov. 14, 1968
[45] Patented Mar. 9, 1971
[73] Assignee Allis-Chalmers Manufacturing Company
 Milwaukee, Wis.

[54] CORROSION RESISTANT BODY LINING AND SEAT FOR BUTTERFLY VALVE
2 Claims, 2 Drawing Figs.

[52] U.S. Cl. ................................................. 137/375, 251/306
[51] Int. Cl. ..................................................... F16k 27/12, F16k 1/226
[50] Field of Search ........................................... 137/375; 251/305—308, 173, 148

[56] References Cited
UNITED STATES PATENTS

| | | | |
|---|---|---|---|
| 2,863,630 | 12/1958 | Broz | 251/173 |
| 3,100,500 | 8/1963 | Stillwagon | 251/306X |
| 3,241,806 | 3/1966 | Snell | 251/306X |
| 3,306,573 | 2/1967 | Trefil | 251/306 |
| 3,425,439 | 2/1969 | Duffey et al. | 137/375 |

Primary Examiner—Henry T. Klinksiek
Attorneys—John P. Hines, Robert B. Benson and Thomas F. Kirby ABSTRACT: A butterfly valve wherein all of the surfaces of the valve body which are exposed to the fluid being controlled by the valve is covered with a one piece corrosion-resistant lining. The valve also includes a corrosion-resistant seat which is supported and retained by the lining.

PATENTED MAR 9 1971 3,568,709

Inventor
Paul E. Fitking
by John C Hines
Attorney

CORROSION RESISTANT BODY LINING AND SEAT FOR BUTTERFLY VALVE

This invention pertains in general to butterfly valves and more particularly to a butterfly valve wherein the metallic surfaces of the valve body are completely covered by a noncorrosive lining and wherein a corrosion-resistant seat is supported and retained by the corrosion-resistant lining.

Because of their comparative low cost and simplicity of design, butterfly valves are being utilized in more and varied applications. In many applications butterfly valves are utilized to control the flow of water and other corrosive fluids. Unless adequate protection is provided for the flow passages of the valve, corrosive effect, a buildup of corrosive products and deposition of foreign materials may materially shorten the useful life of the valve. This action of the fluid can be overcome by fabricating the valve of a corrosion-resistant material such as stainless steel. This, however, adds considerably to the cost of the valve and in large installations may prove to be prohibitively expensive.

Another approach for a solution to the problem is to line the portions of the valve which are exposed to the fluid with a noncorrosive substance such as rubber. This, however, presents two problems: one, being that it is extremely difficult to protect from the fluid those portions of the body which are not lined; and, secondly, it prohibits the use of a metallic seat which is necessary in some applications where positive sealing is required.

It is, therefore, the general object and intention of this invention to provide a butterfly valve with a seat of noncorrosive material and with a noncorrosive lining on all of the surfaces of the valve body which are exposed to the fluid being controlled and which lining supports and retains the valve seat in the valve body.

Figure 2:
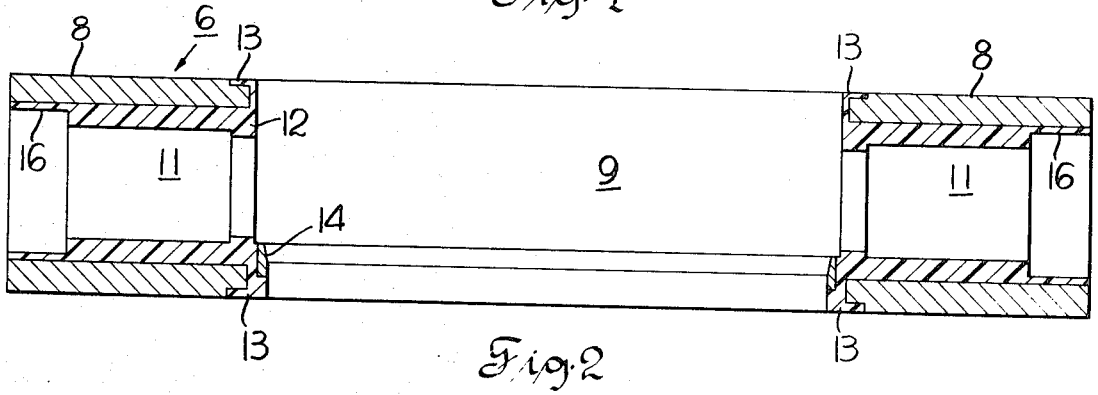

This and other objects of the subject invention will become more fully apparent as the following description is read in light of the attached drawing wherein:

FIG. 1 is a side view of one form of butterfly valve constructed in accordance with the invention; and FIG. 2 is a cross section taken along the lines II—II of FIG. 1.

Referring to the attached drawing, the butterfly valve body of the subject invention is generally designated 6. To provide sufficient strength to the valve body, the outer portion 7 is metallic such as for instance cast iron. The valve body is provided with a pair of oppositely disposed shaft housings 8, and also with a fluid confining passageway 9 extending through the body. Each of the shaft housings 8 is provided with a shaft bore 11 to receive a butterfly valve shaft (not shown).

In most instances the metallic body portion 7 is made of materials which are subject to corrosion. It would be possible to construct this portion of the valve of a noncorrosive steel such as for instance stainless steel; however, this would increase the price of the valve to the extent that it would be prohibitively expensive for many applications. Therefore, in applications where water or other corrosive fluids are being controlled, it is necessary to isolate the metallic portions of the valve body which are susceptible to corrosion. To this end, a one piece lining 12 of corrosion-resistant material is applied about the interior surfaces of the valve body. This lining 12 is preferably molded and bonded to the interior of the valve body. It should be understood that the precise manner of molding the lining to the valve body does not form a part of this invention, and it is quite possible that the lining could be mechanically attached to the valve body. The lining 12 completely covers the interior surface of the passageway 9 as well as the exposed interior surfaces of the bores 11. Furthermore, the lining 12 extends to the ends of the passageway 9 and radially outward therefrom to form an annular lip 13 at either end of the passageway.

A metallic seat ring 14 preferably constructed of stainless steel or any other similar noncorrosive metal may be applied about the passageway 9. This metallic seat ring 14 may be completely supported and retained by the lining 12.

Relieved portions 16 may be provided at the ends of the shaft housing 8 to permit use of thrust bearing or a shaft packing.

From the description it can be seen that the surfaces of the valve body which might possibly be exposed to the fluid are completely lined with a one piece lining of noncorrosive material thereby adequately isolating the metallic portion of the valve body from the fluid. Furthermore, the seat ring 14 may be also supported and retained in the valve body. Since the seat ring is composed of a noncorrosive material such as stainless steel, it is not affected by the corrosive action of the fluid and furthermore, since it is insulated from the less noble metal of the valve body, galvanic action between the valve seat ring and the valve body is prohibited.

Although only one embodiment of the subject invention has been herein shown and described, other embodiments will be apparent to those skilled in the art after they have read this description and it is intended that all such embodiments as come within a reasonable interpretation of the appended claims be covered.

I claim:

1. In a butterfly valve having a metallic body with a fluid passageway therethrough and a pair of oppositely disposed shaft bores, the improvement comprising: a one piece lining of corrosion-resistant material applied about the interior surface of said body which defines said passageway and said shaft bores; and a corrosion-resistant seat ring supported and retained exclusively by said lining free of any contact with said valve body, said seat ring supported and retained exclusively by said lining free of any contact with said valve body, said seat ring positioned about said fluid passageway to one side of the axis of said shaft bores for fluid sealing engagement to effectively seal said passageway when the valve is in the closed position.

2. In a butterfly valve having a metallic body with a fluid passageway therethrough and a pair of oppositely disposed shaft bores, the improvement comprising: a one piece lining of corrosion-resistant material applied about the interior surface of said body which defines said passageway and said shaft bores; and a metallic seat ring composed of a metal more resistant to corrosion than the metal of said valve body positioned about said fluid passageway for fluid sealing engagement to effectively seal said passageway when the valve is in the closed position.

FO-1050
(5/69)

UNITED STATES PATENT OFFICE
CERTIFICATE OF CORRECTION

Patent No. 3,568,709                    Dated   March 9, 1971

Inventor(s)   Paul E. Fitting

It is certified that error appears in the above-identified patent and that said Letters Patent are hereby corrected as shown below:

Column 2, lines 44, 45, 46, cancel beginning with "supported and retained exclusively by said lining free of any contact with said valve body, said seat ring".

Signed and sealed this 6th day of July 1971.

(SEAL)
Attest:

EDWARD M. FLETCHER, JR.                WILLIAM E. SCHUYLER, JR.
Attesting Officer                       Commissioner of Patents